US005606214A

United States Patent [19]
Corsaro

[11] Patent Number: 5,606,214
[45] Date of Patent: Feb. 25, 1997

[54] SMART ACTUATOR FOR ACTIVE SURFACE CONTROL

[75] Inventor: Robert D. Corsaro, Waldorf, Md.

[73] Assignee: The United States of America as represented by the Secretary of the Navy, Washington, D.C.

[21] Appl. No.: 521,742

[22] Filed: Aug. 31, 1995

[51] Int. Cl.$^6$ .............................. G01P 15/00; H01L 41/08
[52] U.S. Cl. .......................................... 310/329; 73/514.34
[58] Field of Search .................................. 310/329, 358; 73/514.34, 514.15

[56] References Cited

U.S. PATENT DOCUMENTS

| | | | |
|---|---|---|---|
| 3,151,487 | 10/1964 | Schuck | 73/517 |
| 3,739,202 | 6/1973 | Cady | 310/329 |
| 4,683,396 | 7/1987 | Takeuchi et al. | 310/358 |
| 4,804,875 | 2/1989 | Albert | 310/321 |
| 4,963,782 | 10/1990 | Bui et al. | 310/358 |
| 5,334,903 | 8/1994 | Smith | 310/358 |
| 5,376,859 | 12/1994 | Kim et al. | 310/358 |

FOREIGN PATENT DOCUMENTS

| | | | |
|---|---|---|---|
| 0035786 | 2/1990 | Japan | 310/358 |
| 1809392 | 4/1993 | U.S.S.R. | 73/514.34 |

Primary Examiner—Thomas M. Dougherty
Attorney, Agent, or Firm—Thomas E. McDonnell; John Karasek

[57] ABSTRACT

The present invention is a controllable surface based upon a 1:3 piezoelectric composite (sometimes referred to as a 1–3 composite or a ⅓ composite). The 1:3 piezoelectric composite has a first planar electrode plate, a first plurality of piezoelectric rods fixed to and extending normally from the first planar electrode plate, a second plurality of piezoelectric rods fixed to and extending normally from the first planar electrode plate, and a second planar electrode plate, coupled to the first plurality of piezoelectric rods and decoupled from the second plurality of piezoelectric rods, essentially parallel to and opposing the first planar electrode plate. The first plurality of piezoelectric rods act as actuators, and urge the first planar electrode plate in a direction normal to said plate in response to an actuator signal (applied as a bias between the two planar electrode plates). The second plurality of piezoelectric rods act as accelerometers, and generate an accelerometer signal in response to an accelerating force acting upon the first planar electrode plate. The controllable surface also includes an accelerometer mass, fixed to the second plurality of piezoelectric rods, for providing inertial mass to the second plurality of piezoelectric rods.

8 Claims, 2 Drawing Sheets

SMART ACTUATOR FOR ACTIVE SURFACE CONTROL

BACKGROUND OF THE INVENTION

1. Field of the Invention

The present invention relates to active surface control, and more particularly to an active surface control system using a 1:3 piezoelectric composite in an active surface control system, and a method for making the same.

2. Description of the Related Art

Active surface control entails controlling the vibration in a surface by monitoring vibration in the surface with one or more sensors, and correcting this vibration with one or more actuators, typically with a negative feedback loop sending a correction signal to the actuators based upon the signal from the sensors. Usually, it is desired to cancel vibrations in the controlled surface, thereby providing a vibration-free surface. In other applications, it is desired to maintain vibration in the controlled surface at some preselected level.

Structural vibration and acoustic studies have revealed the extraordinarily complex nature of point-excited structures and of single-location monitoring. The use of large area actuators and sensors significantly reduces this complexity. Large area uniform actuators tend to couple primarily in the perpendicular direction, and tend not to excite extraneous modes or waves. Likewise, sensors that integrate response over a large area tend to extract only perpendicular wave components.

Unfortunately, construction of large area integrating sensor/actuator combinations are currently very costly. To obtain a good average response, a very large number of acceleration sensors must be used. Currently, these accelerometers must be fabricated as single units and separately wired, a costly endeavor.

SUMMARY OF THE INVENTION

Accordingly, it is an object of this invention to provide a controllable surface that is suitable for low cost manufacture, and amenable to large area averaging of vibrational signals and widely distributed actuator responses to those signals.

These and additional objects of the invention are accomplished by the structures and processes hereinafter described.

The present invention is a controllable surface based upon a 1:3 piezoelectric composite (sometimes referred to as a 1–3 composite or a ⅓ composite). The present invention has a first planar electrode plate, a first plurality of piezoelectric rods fixed to and extending normally from the first planar electrode plate, a second plurality of piezoelectric rods fixed to and extending normally from the first planar electrode plate, and a second planar electrode plate, coupled to the first plurality of piezoelectric rods and decoupled from the second plurality of piezoelectric rods, essentially parallel to and opposing the first planar electrode plate. The first plurality of piezoelectric rods act as actuators, and urge the first planar electrode plate in a direction normal to said plate in response to an actuator signal (applied as a bias between the two planar electrode plates). The second plurality of piezoelectric rods act as accelerometers, and generate an accelerometer signal in response to an accelerating force acting upon the first planar electrode plate. The controllable surface also includes an accelerometer mass, fixed to the second plurality of piezoelectric rods, for providing inertial mass to the second plurality of piezoelectric rods. As used herein, the term "piezoelectric rod" refers to an injection molded piezoelectric rod made substantially by the processes described in U.S. Pat. No. 5,340,510, issued Aug. 23, 1994 to Bowen, which is incorporated herein by reference, in its entirety, for all purposes.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Preferred embodiments of the present invention will typically use SonoPanel™, a commercially available product manufactured by Materials Systems Inc. SonoPanel™ is an injection molded array of piezoelectric rods disposed in a compliant polymer matrix.

Figure 1:
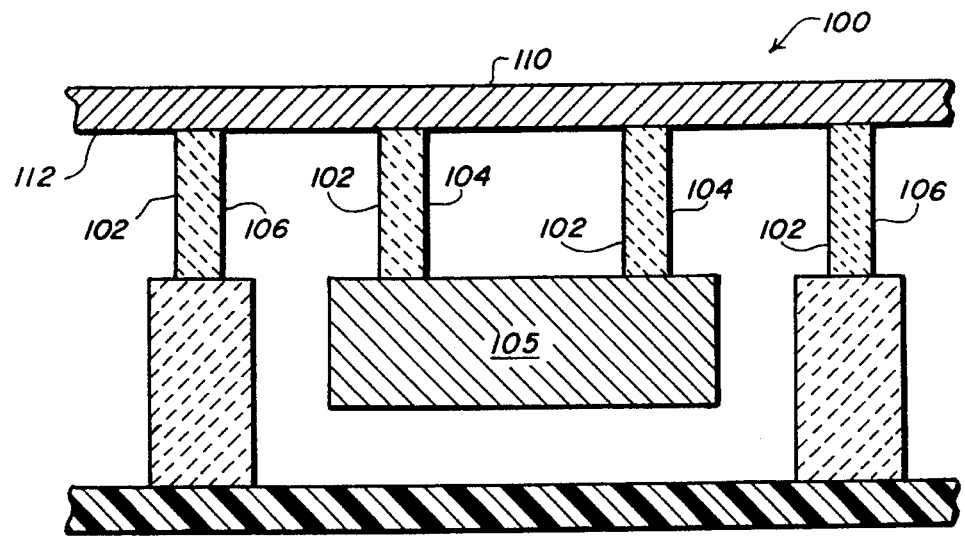
FIG. 1 shows a sectional view of a portion of a controlled surface according to the invention.

Referring to FIG. 1, a portion 100 of a controlled surface according to the invention has a plurality of parallel piezoelectric rods 102. A subset 104 of these rods (referred to as the accelerometer rods) have one end fixed to an inertial mass 105. The other rods (referred to as the actuator rods 106) are not fixed to the inertial mass 105. Opposing this inertial mass 105 and fixed to all of the piezoelectric rods 102 is a rigid backing 110. All of the piezoelectric rods 102 are fixed to a conductive region 112 on this rigid backing 110: either the rigid backing 110 has a single conductive region (e.g., the rigid backing is a conductor), or separate conductive regions for the actuator rods and the accelerometer rods are patterned on the rigid backing, these regions being electrically isolated with respect to each other.

When an actuator signal is applied to the first plurality of piezolelectric rods 102, the first plurality of piezoelectric rods 102 exert a normal force against the rigid backing 110.

Since 1:3 composites are typically manufactured with the piezoelectric rods contained within a three-dimensionally-connected organic polymer matrix, the controllable surface of the invention typically will have an organic polymer matrix disposed about the piezoelectric rods, and between the first and second electrode plates. Frequently, manufacturing a controllable surface according to the invention will entail removing some or all of this polymer matrix, or manufacturing the 1:3 composite without the polymer matrix in some regions.

Figure 2:
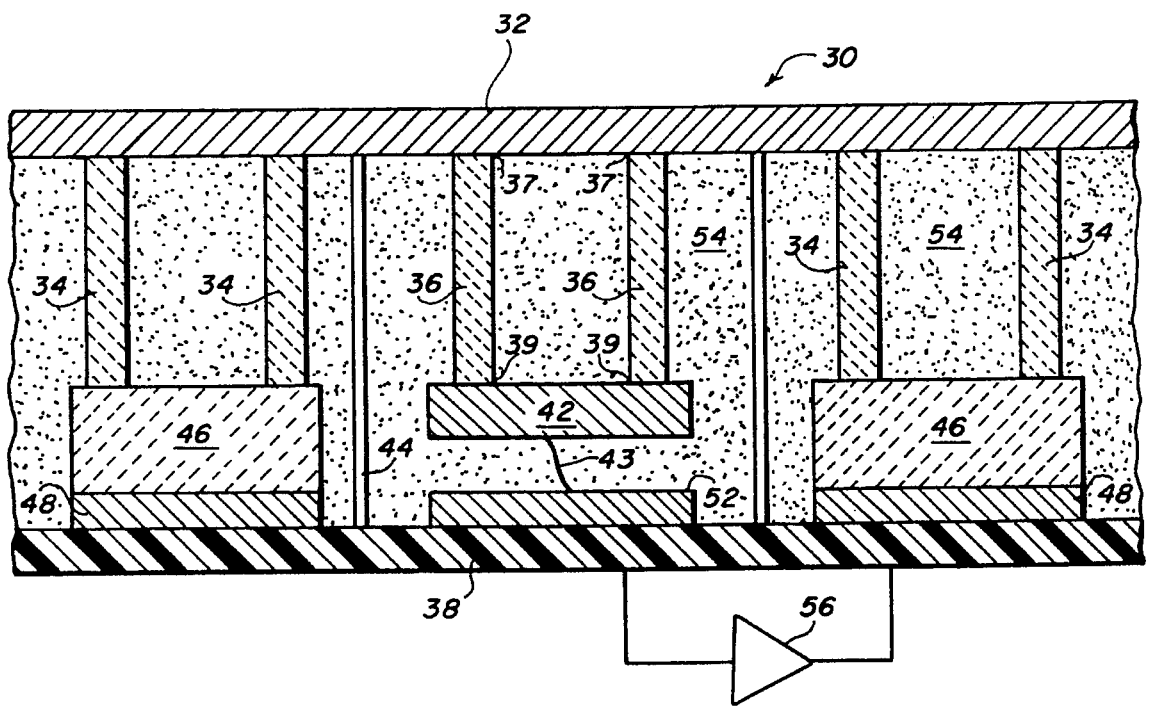
FIG. 2 shows another sectional view of a preferred embodiment of the invention.

FIG. 2, showing a preferred controllable surface 30 according to the invention, illustrates one way of coupling the accelerometer and actuator portions of the controllable surface together, to provide continuous active control of the surface. This embodiment of the invention has a first planar electrode plate 32 parallel to and opposing a second 48 and a third 52 planar electrode plate. The second 48 and a third 52 planar electrode plate are coplanar and parallel to each other, and preferably are fixed to a common substrate 38. Fixed to and extending normally from the first electrode plate 32 are a first plurality of piezoelectric rods 34. These piezoelectric rods 34 are also coupled to the second electrode plate 48, typically through a conductive spacer 46 interposed between the first plurality of piezoelectric rods 34 and the second electrode plate 48. Alternatively, these rods 34 may be directly fixed to the second electrode plate 48.

Also fixed to and extending normally from the first electrode plate 32 are a second plurality of piezoelectric rods 36. These piezoelectric rods 36 are decoupled from the second piezoelectric plate 48. Preferably, these rods are coupled to a mass 42 for providing inertia. These rods with the attached mass will serve to generate an accelerometer signal when an accelerating normal force is applied to the first electrode plate 32. These rods are electrically connected to the third planar electrode plate 52, typically through a flexible conductor 43. Alternatively, a metal spring or a conductive rubber may be used in place of the flexible lead 43, so long as the conductor maintains the electrical connection between the piezoelectric rods 36 and the third planar electrode plate 52 while the rods are stretching and contracting, without an excessive failure rate.

Connected between the third planar electrode plate 52 and the second electrode plate 48 is a feedback circuit, shown here in a typical embodiment as an amplifier 56. When an accelerating force is applied to the first electrode plate 32, the ends 37 of the second plurality of piezoelectric rods 36 fixed to the first electrode plate 32 are displaced with the plate 32. In contrast, the opposite ends 39 of the second plurality of piezoelectric rods 36 will tend not to move with the plate 32, due to the inertia of the mass 42. The difference between the movements of the ends 37,39 of the rods 36 results a change in length for these piezoelectric rods, which in turn produces an accelerometer signal. This accelerometer signal is directed to the third planar electrode plate 52, and thence to the feedback amplifier 56, which in turn produces an actuator signal for controlling the movement of the first electrode plate. When this actuator signal is applied to the first plurality of piezoelectric rods 34, as a bias between the first electrode plate 32 and the second electrode plate 48, the first plurality of piezoelectric rods 34 exert a normal force against the first electrode plate 32, thereby controlling the movement of the first electrode plate 32.

Shielding 44 (which may be electrostatic shielding or electromagnetic shielding, as needed), may be placed between the first plurality of piezoelectric rods 34 and the second plurality of piezoelectric rods 36, to prevent crosstalk between the rods. Likewise, an organic polymer matrix 54 may be disposed between the electrode plates, although manufacturing a controllable surface 30 according to the invention typically will entail removing some or all of this polymer matrix 54.

Figure 3:
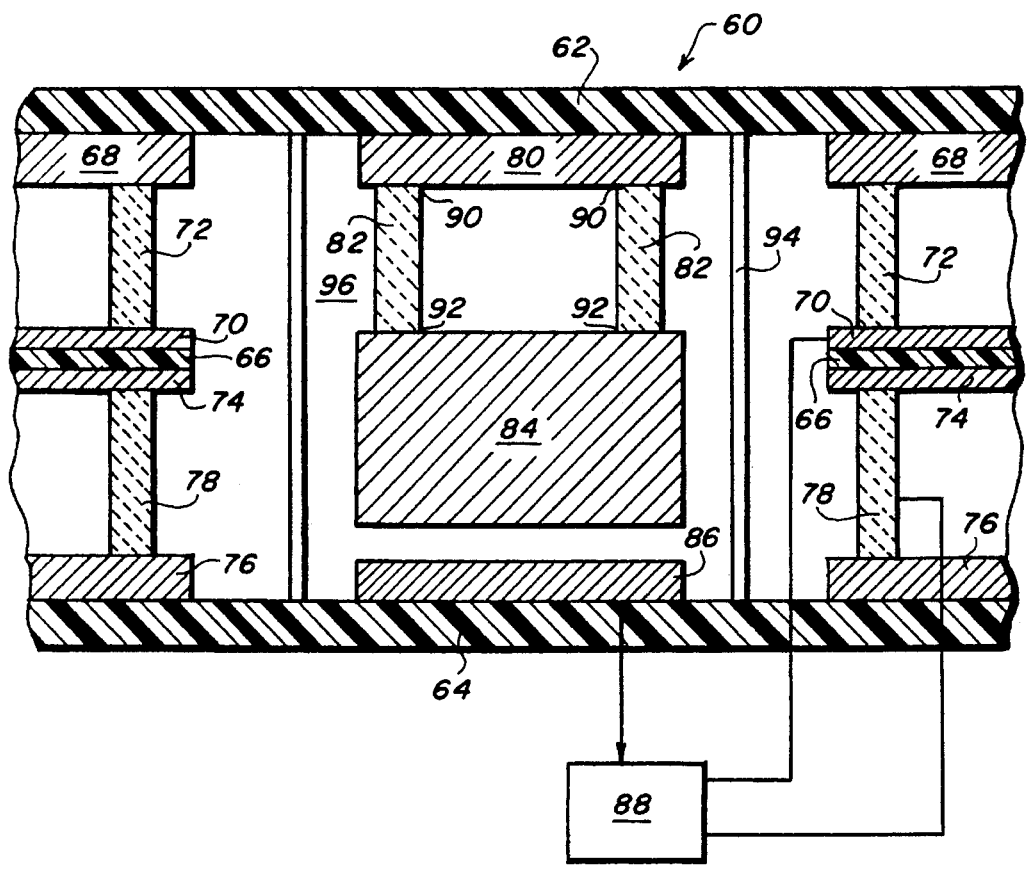
FIG. 3 shows another sectional view of a preferred embodiment of the invention.

Referring to FIG. 3, another preferred controllable surface 60 according to the invention illustrates combining pressure sensing capability and acceleration sensing capability in a controllable surface.

This embodiment of the invention has a first planar substrate 62 parallel to and opposing a second planar substrate 64. Interposed between and parallel to the first and second planar substrates 62, 64 is a third planar substrate 66. Fixed to the first planar substrate 62 and facing the third planar substrate 66 is a first planar electrode 68. Fixed to the third planar substrate 68 and facing the first planar substrate 62 is a second planar electrode 70. Fixed to and disposed perpendicularly between the first planar electrode 68 and second planar electrode 70 is a first plurality of piezoelectric rods 72 for pressure sensing.

Fixed to the third planar substrate 66 and facing the second planar substrate 64 is a third planar electrode 74. Fixed to the second planar substrate 64 and facing the third planar substrate 66 is a fourth planar electrode 76. Fixed to and disposed perpendicularly between the third planar electrode 74 and fourth planar electrode 76 is a second plurality of piezoelectric rods 78.

Fixed to the first planar substrate, and coplanar with and decoupled from the first planar electrode 68 is a fifth planar electrode 80. Fixed to and extending normally from the fifth planar electrode 80 is a second plurality of piezoelectric rods 82. Preferably, these rods are coupled to a mass 84 for providing inertia. These rods with the attached mass will serve to generate an accelerometer signal when an accelerating normal force is applied to the first planar substrate 62. This accelerometer signal is directed to a sixth planar electrode 86, and thence to a control circuit 88. This control circuit takes the accelerometer signal, and optionally a pressure signal from the first plurality of piezoelectric rods 72, and generates an actuator signal for controlling the movement of the first planar substrate 62.

When an accelerating force is applied to the first planar substrate 62, the ends 90 of the second plurality of piezoelectric rods 82 fixed to the fifth electrode plate 80 are displaced with the plate 80 and substrate 62. In contrast, the opposite ends 92 of the second plurality of piezoelectric rods 82 will tend not to move with the substrate 62, due to the inertia of the mass 84. The difference between the movements of the ends 90,92 of the rods 82 results a change in length for these piezoelectric rods, which in turn produces an accelerometer signal. This accelerometer signal is directed to the sixth planar electrode plate 86, and thence to the control circuit 88, which in turn produces an actuator signal for controlling the movement of the first substrate. When this actuator signal is applied to the second plurality of piezoelectric rods 78, as a bias between the third electrode plate 74 and the fourth electrode plate 76, the second plurality of piezoelectric rods 78 exert a normal force against the third electrode plate 74, thereby controlling the movement of the first planar substrate 62.

As in the previous embodiments, shielding 94 may be placed to prevent cross-talk between the rods. Likewise, an organic polymer matrix 96 may be disposed between the electrode plates, although manufacturing a controllable surface 60 according to the invention typically will entail removing some or all of this polymer matrix 96.

The structures of the invention made be made from 1:3 composite materials. Commercially available 1:3 composites may be employed in the present invention. Likewise, 1:3 composites made be specially made for use in the present invention, following the teachings of the Bowen patent, supra.

A preferred method of making a controllable surface according to the invention is as follows. From a 1:3 piezoelectric composite having (1) a planar electrode plate, and (2) a plurality of piezoelectric rods fixed normally to one side of this electrode plate, a subset of these piezoelectric rods are selected for accelerometer use, and an exclusive subset of the rods are selected for actuator use (i.e., no rod is selected to be both an actuator rod and an accelerometer rod). Typically, a mass is fixed to the ends of the accelerometer rods opposing the electrode plate.

The actuator rods are fixed to a second rigid backing (optionally with a spacer interposed between the rods and the second rigid backing), to permit free oscillation of the accelerometer rods and the inertial mass. Shielding is preferably positioned between the accelerometer rods and the actuator rods, to prevent cross-talk between the rods.

In a preferred method, the first rigid backing is a conductor, and serves as a ground for the rods, and the second rigid backing has separate actuator and accelerometer electrodes patterned on an insulating substrate. The spacer between the actuator rods and the actuator electrode is conductive. A flexible conductive lead is interposed between the accelerometer electrode and either the accelerometer rods or optionally the inertial mass (if the mass is conducting and in electrical contact with the rods).

In another method according to the invention, two 1:3 composites are used to make a controllable surface of the type shown in FIG. 3. These two 1:3 composites typically will have (1) a plurality of parallel piezoelectric rods, (2) a pair of planar electrodes contacting opposing ends of the piezoelectric rods, and (3) a pair of backings for these electrodes.

From a first piezoelectric composite having (1) a backing, (2) at least one planar electrode on this backing, and (3) a plurality of piezoelectric rods fixed normally to an electrode on the backing, a subset of these piezoelectric rods are selected for accelerometer use, and an exclusive subset are selected for pressure sensor use. Optionally, a mass is fixed to the ends of the accelerometer piezoelectric rods opposing the electrode plate. The accelerometer piezoelectric rods and the pressure sensor piezoelectric rods should be electrically isolated from each other. Thus, if the accelerometer piezoelectric rods are fixed to the same electrode on the backing as the pressure sensing piezoelectric rods, this electrode should be divided into separate, electrically isolated electrodes. The acceleration sensing piezoelectric rods preferably are coupled to an inertial mass.

The first 1:3 composite also includes a second planar electrode plate, and the pressure sensing piezoelectric rods are coupled to this electrode plate. Typically, this planar electrode plate will be coupled to a second backing.

The second 1:3 composite typically will have a backing that will be fixed to the second backing on the first 1:3 composite. Typically, a channel will be opened through the two joined backings and the electrode plates coupled to them, to permit the inertial mass freedom of movement. The second 1:3 composite also includes actuator piezoelectric rods in contact with an actuator electrode. The second 1:3 composite also includes an accelerometer electrode in electrical contact with the accelerometer piezoelectric rods. The accelerometer electrode and the actuator electrode should be electrically isolated. Thus, the single planar electrode contacting one set of ends of the piezoelectric rods that this second 1:3 composite will typically be manufactured with will be divided into separate electrically isolated accelerometer and actuator electrodes. Typically, some of the piezoelectric rods in the second 1:3 composite will be remover to permit the inertial mass freedom of movement.

Skilled practitioners will recognize that competing design concerns will sometimes be present in selecting an embodiment of the invention. For example, skilled practitioners will recognize that the selection of an inertial mass will affect the sensitivity and resonance frequency of the accelerometer. Sensitivity (S) of the accelerometer is approximately given by:

$$S = \frac{g_{33}t}{A}\left(m_{top} + \frac{m_{rod}}{2}\right)$$

where $g_{33}$ is the piezoelectric coefficient for thickness-poled, thickness-displaced operation, A is the sum of the cross-sectional areas of the piezoelectric accelerometer rods, $M_{top}$ is the mass of the inertial mass, and $m_{rod}$ is the mass of the rod. Thus, sensitivity varies linearly with the size of the inertial mass.

On the other hand, for a device with a rigid mounting structure, the resonant frequency $f_r$ is approximately given by:

$$f_r = \frac{1}{2\pi}\sqrt{\frac{Y_s A}{t\left(M_{top} = \frac{m_{rod}}{3}\right)}}$$

where $Y_s$ is Young's modulus and t is the thickness (i.e., distance between the ends) of the piezoelectric rods. Thus, the resonant frequency will decrease as the size of the inertial mass increases. In this way, a bandwidth can be selected by selecting the size of the inertial mass. Resonant frequencies up to at least 10 kHz will typically be desired for the present invention.

Skilled practitioners will also recognize that piezoelectric rod radius and stiffness of backing materials will affect the high frequency response of the present invention. Skilled practitioners will also recognize that although piezoelectric actuator rods and piezoelectric accelerometer rods may be made to have the same shape and performance characteristics according to the present invention, it will typically be preferred to separately optimize the performance charateristics of the piezoelectric actuator rods and the piezoelectric accelerometer rods, with the consequence that the piezoelectric actuator rods and the piezoelectric accelerometer rods will typically have different sizes and shapes.

Having described the invention, the following examples are given to illustrate specific applications of the invention, including the best mode now known to perform the invention. These specific examples are not intended to limit the scope of the invention described in this application.

For each of the following examples, a standard benchtop setup was used. A B&K model 4808 shaker table was used as the vibration source, and an Endevco model 2250a accelerometer was used as a reference accelerometer, and for calibration.

EXAMPLE 1

Measurement of Accelerometer Sensitivity, and Comparison to the Model

From a piece of Materials Systems Inc. (MSI) Sono-Panel™, an 11×11 accelerometer was fashioned. The pins were PZT-5, and were 0.25" long with 0.10" spacing between pins.

Figure 4:
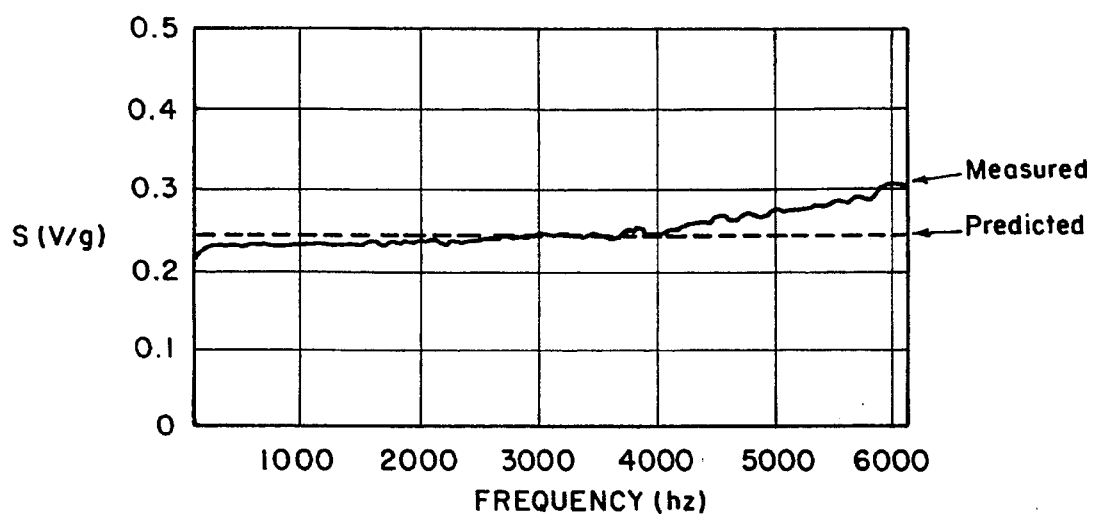
FIG. 4 shows the measured sensitivity of an accelerometer in a controlled surface according to the invention, as a function of frequency, compared to a predicted sensitivity.

As shown in FIG. 4, the sensitivity was measured to be about 0.25 volts/g with a flat response up to about 5 kHz. Thus, the sensitivity of the accelerometer was high, and in good agreement with the model.

EXAMPLE 2

Measurement of Performance Characteristics for a Variety of Accelerometers

From a piece of Materials Systems Inc. (MSI) Sono-Panel™, a series of accelerometers was fashioned. The pins were PZT-5, and were 0.25" long with 0.10" spacing between pins. For comparison, the performance characteristics of a Wilcoxon model 759 accelerometer were measured as well. The results are shown in Table 1, below:

TABLE 1

| sample (# of pins) | sensitivity S (volts/g) | capacitance C (pF) | resonant freq. $f_r$ (kHz) | minimum detectable acceleration $a_{min}$ (μg with 20 kHz bw) |
| --- | --- | --- | --- | --- |
| 19 × 19 | 0.46 | 1690 | 12 | 4.4 |
| 19 × 10 | 0.29 | 888 | 12 | 7 |
| 11 × 11 | 0.24 | 566 | 13 | 10 |
| 2 × 19 | 0.31 | 178 | 11 | 10 |
| 4 × 4 | 0.63 | 75 | 8.4 | 13 |
| Wilcoxon | 0.10 | (amp) | — | 15 |

The minimum detectable acceleration is also a function of the preamplifier noise, which in this example was an Ithaco™ preamplifier.

Obviously, many modifications and variations of the present invention are possible in light of the above teachings. It is therefore to be understood that, within the scope of the appended claims, the invention may be practiced otherwise than as specifically described.

What is claimed is:

1. An actuator controllable surface, comprising:
  a) a first plate;
  b) a second plate, essentially parallel with said first plate;
  c) at least one accelerometer, disposed between said first plate and said second plate, for sensing acceleration in said first plate, said at least one accelerometer comprising:
    i) at least one accelerometer piezoelectric member having an end fixed to said first plate;
    ii) a mass fixed to said at least one accelerometer piezoelectric member; and
    iii) an output lead, for conducting an output voltage signal from said at least one accelerometer piezoelectric member, responsive to acceleration in said first plate, to output measuring means for measuring said output voltage signal; and
  d) at least one actuator, disposed between said first plate and said second plate, adapted for urging said first plate in a normal direction.

2. The actuator controlled surface of claim 1, wherein said at least one actuator comprises an actuator piezoelectric member.

3. The actuator controlled surface of claim 2, wherein said at least one actuator further comprises input biasing means for biasing said actuator piezoelectric member with an input voltage signal.

4. A controllable surface, comprising:
  a) a 1:3 piezoelectric composite, further comprising:
    i) a first planar electrode plate;
    ii) a first plurality of piezoelectric rods fixed to and extending normally from said first planar electrode plate, for urging said first planar electrode plate in a direction normal to said plate in response to an actuator signal;
    iii) a second plurality of piezoelectric rods fixed to and extending normally from said first planar electrode plate, for generating an accelerometer signal in response to an accelerating force acting upon said first planar electrode plate; and
    iv) a second planar electrode plate, coupled to said first plurality of piezoelectric rods and decoupled from said second plurality of piezoelectric rods, essentially parallel to and opposing said first planar electrode plate; and
  b) an accelerometer mass, fixed to said second plurality of piezoelectric rods, for providing inertial mass to said second plurality of piezoelectric rods.

5. The controllable surface of claim 4, further comprising:
  c) control means for generating said actuator signal and directing said actuator signal to said first plurality of piezoelectric rods responsive to said accelerometer signal.

6. A controllable surface, comprising:
  a) a 1:3 piezoelectric composite, further comprising:
    i) a first planar electrode plate;
    ii) a first plurality of piezoelectric rods fixed to and extending normally from said first planar electrode plate, for generating an accelerometer signal in response to a force acting upon said first planar electrode plate;
    iii) a second plurality of piezoelectric rods fixed to and extending normally from said first planar electrode plate, for generating a pressure signal in response to said force acting upon said first planar electrode plate;
    iv) a second planar electrode plate, coupled to said second plurality of piezoelectric rods and decoupled from said first plurality of piezoelectric rods, essentially parallel to and opposing said first planar electrode plate;
    v) a third plurality of piezoelectric rods fixed to and extending normally from said second planar electrode plate, for urging said second planar electrode plate in a direction normal to said second planar electrode plate in response to an actuator signal, thereby urging said second plurality of piezoelectric rods and said first planar electrode plate in a direction normal to said second planar electrode plate; and
    vi) a third planar electrode plate, coupled to said third plurality of piezoelectric rods and decoupled from said first plurality of piezoelectric rods, essentially parallel to and opposing said second planar electrode plate; and
  b) an accelerometer mass, fixed to said first plurality of piezoelectric rods, for providing inertial mass to said first plurality of piezoelectric rods.

7. The controllable surface of claim 6, further comprising:
  c) control means for generating said actuator signal and directing said actuator signal to said first plurality of piezoelectric rods responsive to said accelerometer signal or to said pressure signal.

8. The controllable surface of claim 6, further comprising:
  c) control means for generating said actuator signal and directing said actuator signal to said first plurality of piezoelectric rods responsive to said accelerometer signal and to said pressure signal.

* * * * *